(12) United States Patent
Martin

(10) Patent No.: US 11,657,698 B2
(45) Date of Patent: May 23, 2023

(54) PROVIDING INTERNET ACCESS THROUGH A PROPERTY MONITORING SYSTEM

(71) Applicant: Alarm.com Incorporated, Tysons, VA (US)

(72) Inventor: Jean-Paul Martin, Oakton, VA (US)

(73) Assignee: Alarm.com Incorporated, Tysons, VA (US)

( * ) Notice: Subject to any disclaimer, the term of this patent is extended or adjusted under 35 U.S.C. 154(b) by 31 days.

(21) Appl. No.: 17/353,520

(22) Filed: Jun. 21, 2021

(65) Prior Publication Data

US 2021/0375120 A1    Dec. 2, 2021

Related U.S. Application Data

(63) Continuation of application No. 17/027,578, filed on Sep. 21, 2020, now Pat. No. 11,043,107, which is a continuation of application No. 16/412,598, filed on May 15, 2019, now Pat. No. 10,783,768, which is a continuation of application No. 15/887,533, filed on Feb. 2, 2018, now Pat. No. 10,339,788, which is a
(Continued)

(51) Int. Cl.
  *G08B 25/00*    (2006.01)
  *G08B 25/08*    (2006.01)
  *H04W 84/12*    (2009.01)

(52) U.S. Cl.
  CPC ........... *G08B 25/004* (2013.01); *G08B 25/08* (2013.01); *H04W 84/12* (2013.01)

(58) Field of Classification Search
  CPC ...... G08B 25/08; G08B 25/004; H04W 84/12
  See application file for complete search history.

(56) References Cited

U.S. PATENT DOCUMENTS 7,085,551 B1    8/2006  Bonner et al.
7,391,315 B2    6/2008  Friar
(Continued)

OTHER PUBLICATIONS

PCT Notification of Transmittal of the International Search Report and the Written Opinion for International Application No. PCT/US2016/022380 dated Jun. 6, 2016, 8 pages.
(Continued)

*Primary Examiner* — Congvan Tran
(74) *Attorney, Agent, or Firm* — Fish & Richardson P.C.

(57) ABSTRACT

Methods and systems, including computer programs encoded on computer storage media, for providing internet access through a control panel of an alarm system, the method including establishing, by a control panel of an alarm system in a property, a first connection to an alarm system monitoring server across a cellular network, determining that a known source of internet within the property is not available, in response to determining that the known source of internet within the property is not available, establishing, by the control panel, a second connection to the internet across the cellular network, providing internet access to one or more devices in the property through the second connection, determining that the known source of internet within the property is available, and in response to determining that the known source of internet within the property is available, terminating, by the control panel, the second connection.

20 Claims, 9 Drawing Sheets

Related U.S. Application Data continuation of application No. 15/069,833, filed on Mar. 14, 2016, now Pat. No. 9,886,839.

(60) Provisional application No. 62/132,452, filed on Mar. 12, 2015.

(56) References Cited

U.S. PATENT DOCUMENTS

| | | | |
|---|---|---|---|
| 8,786,425 B1 * | 7/2014 | Hutz | G08B 23/00 340/541 |
| 2007/0066311 A1 | 3/2007 | Reibel et al. | |
| 2008/0220819 A1 | 9/2008 | Ben-Eli | |
| 2008/0261515 A1 | 10/2008 | Cohn et al. | |
| 2008/0293404 A1 | 11/2008 | Scherzer et al. | |
| 2009/0274104 A1 | 11/2009 | Addy | |
| 2011/0279259 A1 | 11/2011 | Jackson | |
| 2012/0083305 A1 | 4/2012 | Alexander et al. | |
| 2012/0257615 A1 | 10/2012 | Eskildsen | |
| 2013/0033379 A1 | 2/2013 | Jentoft | |
| 2013/0120131 A1 | 5/2013 | Hicks, III | |
| 2014/0179257 A1 | 6/2014 | Petite | |
| 2014/0197949 A1 | 7/2014 | Shapiro et al. | |
| 2014/0269660 A1 | 9/2014 | Dunn et al. | |
| 2014/0282048 A1 * | 9/2014 | Shapiro | H04L 12/2818 715/741 |
| 2014/0333772 A1 | 11/2014 | Periyasamy et al. | |
| 2015/0022347 A1 | 1/2015 | Aswath et al. | |
| 2015/0063642 A1 | 3/2015 | Tseng | |
| 2015/0078357 A1 | 3/2015 | L'Heureux et al. | |
| 2015/0085130 A1 | 3/2015 | Hicks, III et al. | |
| 2015/0111569 A1 | 4/2015 | Gupta | |
| 2015/0113169 A1 | 4/2015 | Hogaboom et al. | |
| 2015/0228419 A1 | 8/2015 | Fadell et al. | |
| 2015/0325106 A1 | 11/2015 | Dawes et al. | |
| 2015/0356859 A1 * | 12/2015 | Hwang | G08B 25/08 455/404.1 |
| 2016/0012715 A1 | 1/2016 | Raji et al. | |
| 2016/0140257 A1 * | 5/2016 | Vega | G06F 30/13 703/1 |
| 2016/0180699 A1 | 6/2016 | Cote | |
| 2022/0201589 A1 * | 6/2022 | Cohn | H04W 40/34 |

OTHER PUBLICATIONS

EP Extended European Search Report in European Application No. 16762715.7, dated Nov. 9, 2018, 9 pages.

* cited by examiner

PROVIDING INTERNET ACCESS THROUGH A PROPERTY MONITORING SYSTEM

CROSS REFERENCE TO RELATED APPLICATIONS

This application is a continuation of U.S. application Ser. No. 17/027,578, filed on Sep. 21, 2020, which is a continuation of U.S. application Ser. No. 16/412,598, filed May 15, 2019, now allowed, which is a continuation of U.S. application Ser. No. 15/887,533, filed Feb. 2, 2018, now U.S. Pat. No. 10,339,788, issued Jul. 2, 2019, which is a continuation of U.S. application Ser. No. 15/069,833, filed Mar. 14, 2016, now U.S. Pat. No. 9,886,839, issued Feb. 6, 2018, which claims the benefit of U.S. Provisional Application No. 62/132,452, filed Mar. 12, 2015. All of these prior applications are incorporated by reference in their entirety

TECHNICAL FIELD

This disclosure relates to monitoring technology and, for example, communicating with a monitoring system.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for communicating with a monitoring system. For example, techniques are described for providing internet access through a control panel of a monitoring system.

In general, one innovative aspect of the subject matter described in this specification can be embodied in methods that include the actions of establishing, by a control panel of an alarm system in a property, a first connection to an alarm system monitoring server across a cellular network; determining that a known source of internet within the property is not available; in response to determining that the known source of internet within the property is not available, establishing, by the control panel, a second connection to the internet across the cellular network; providing internet access to one or more devices in the property through the second connection; determining that the known source of internet within the property is available; and in response to determining that the known source of internet within the property is available, terminating, by the control panel, the second connection.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations establishing a first connection to an alarm system monitoring server comprises establishing a private connection over the cellular network to the alarm system monitoring server.

In other implementations establishing a second connection to the internet across the cellular network comprises establishing a public connection to one or more public servers.

In some cases the control panel of the alarm system comprises Wi-Fi access hardware and establishing a second connection to the internet across the cellular network comprises providing internet access using the Wi-Fi access hardware.

In some cases the control panel of the alarm system is in data communication with Wi-Fi access hardware that is located in a physically separate device, and establishing a second connection to the one or more public servers comprises providing internet access using the Wi-Fi access hardware.

In some implementations providing internet access to the one or more devices in the property through the second connection comprises providing internet access to a known internet access point in the property.

In some implementations the method further comprises receiving communications at the control panel of the alarm system; classifying the received communications based on communication type; based on the classification, determining which of the first connection or second connection to transmit the communications through; determining an order in which to transmit the communications; and in response to determining which of the first connection or second connection to transmit the communications through and the order in which to transmit the communications, transmitting the communications through the determined connections in the determined order.

In some implementations determining which of the first connection or second connection to transmit the communications through comprises implementing an algorithm that is pre-programmed in the control panel of the alarm system.

In some cases determining an order in which to transmit the communications comprises, for each communication, assigning a weight to the communication based on at least the determined first or second connection in which the communication is to be transmitted through; and ranking the weighted communications to determine an order in which to transmit the communications.

In other cases determining which of the first connection or second connection to transmit the communications through comprises selecting the first connection and throttling the second connection.

In further cases throttling the second connection comprises disabling the second connection.

In some implementations the method further comprises sending requests for internet access status at regular predetermined intervals of time to an internet access point of the known source of internet within the property.

In other implementations determining that a known source of internet within the property is not available comprises determining that the internet access point of the known source of internet has not responded to the requests for internet access status within a predetermined amount of time.

In some implementations determining that the known source of internet within the property is available comprises determining that the internet access point of the known source has responded to the requests for internet access status within a predetermined amount of time.

In some cases determining that a known source of internet within the property is not available comprises determining that an internet access point of the known source of internet is functioning but the known source of internet within the property that is provided by the known internet access point is not available.

In other cases the method further comprises notifying the one or more devices in the property that internet access is no longer available through the second connection.

In further cases the method further comprises establishing, by the control panel of the alarm system in the property, a third connection to central station server, wherein the third connection is a public connection.

In some implementations the control panel is a client of the known source of internet within the property.

The subject matter described in this specification can be implemented in particular embodiments so as to realize one or more of the following advantages. A monitoring system that provides internet access through a control panel of the monitoring system enables a property in which the monitoring system is located to maintain an internet access connection at all times, even during situations when standard sources of internet, e.g., home wireless routers, fail, such as during power outages. Thus, the reliability and connectivity of an internet connection within the property is improved.

Internet access provided by a control panel of a monitoring system may be unlimited and used for both critical and non-critical data communications. Whilst providing internet access, the monitoring system may select an appropriate connection path to send data communications over. For example the monitoring system may send sensitive or personal data communications through a private connection path, thus maintaining user privacy settings and the security of the monitoring system at all times. Furthermore, in emergency situations the monitoring system may prioritize the transmission of critical data communications over non-critical data communications, thus providing internet access whilst maintaining the reliability of the monitoring system.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Techniques are described for communicating with a monitoring system. The monitoring system may include a control panel that is capable of communicating through both a private connection and a public connection. Accordingly, the control panel may have a dual path with a remote monitoring service as the control panel may communicate with the remote monitoring service through both the private connection and the public connection. The control panel may also use the public connection to provide access to public servers to other devices. For example, the control panel may establish private and public cellular connections, and also have a back-up battery in case of power failure. In the example, an internet access point, e.g., a home wireless router, may be powered off when a power failure occurs so that a user is no longer able to access the internet using their laptop. The control panel may detect the loss of internet access provided by the internet access point, and, in response, provide internet access to the laptop until power is restored.

Figure 1A:
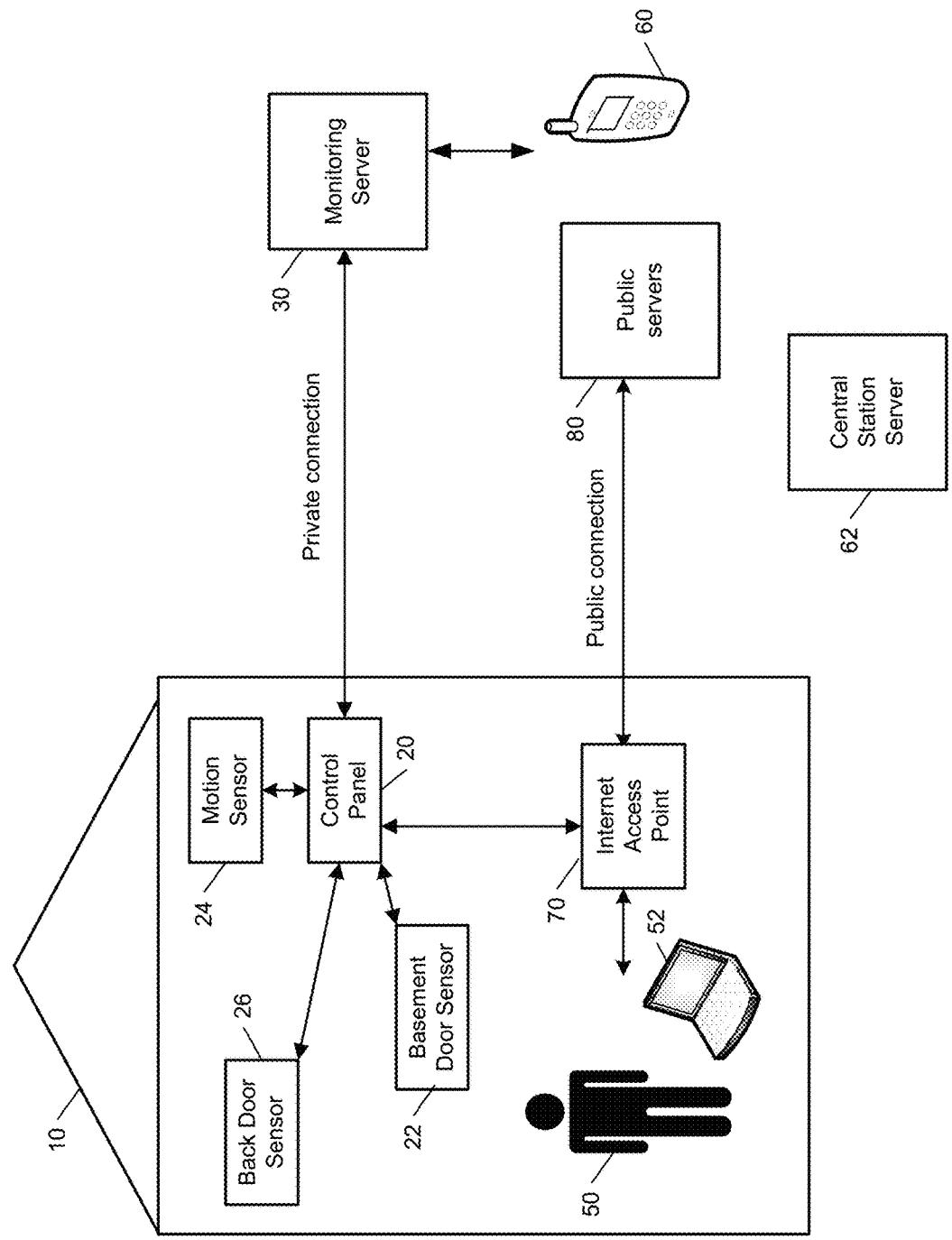
FIGS. 1A-1C illustrate examples of providing internet access through a monitoring system.
Figure 1B:
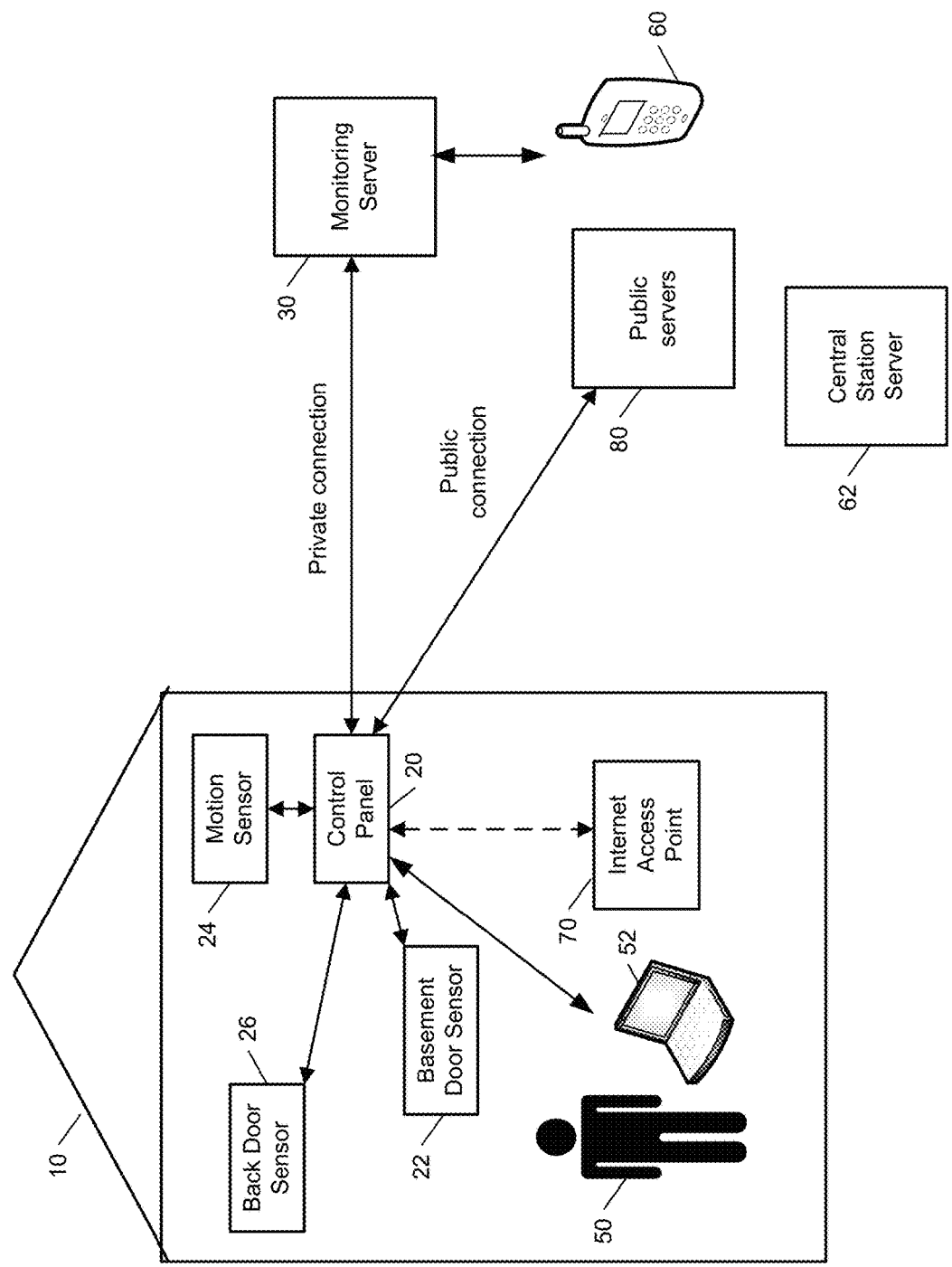
Figure 1C:
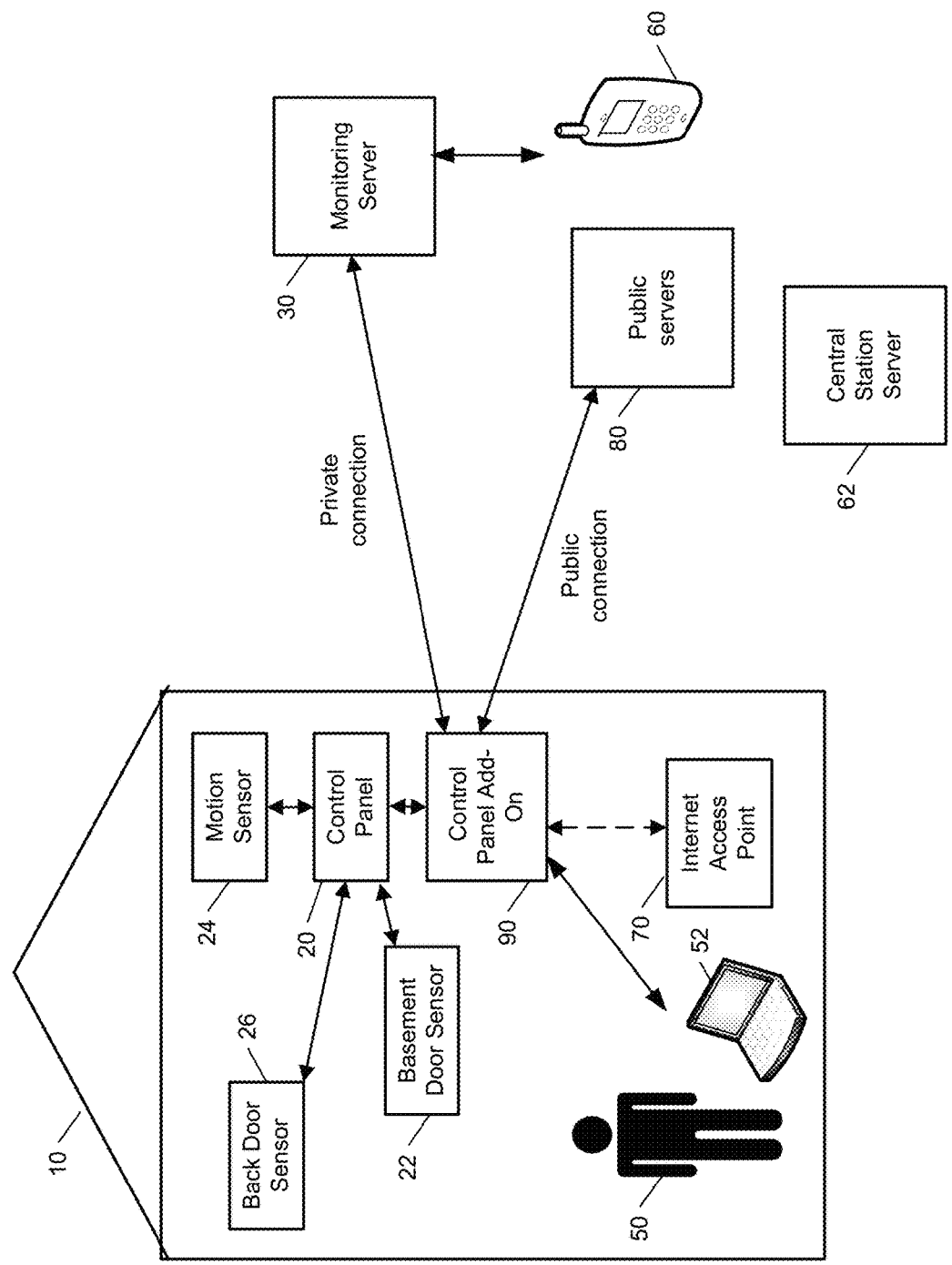

FIGS. 1A-1C illustrate examples of providing internet access through a monitoring system, with FIG. 1A illustrating an example of an internet access point within a property providing communications over a public connection, FIG. 1B illustrating an example of a control panel of a monitoring system in the property providing communications for a user device over a public connection, and FIG. 1C illustrating an example of providing communications for an internet access using a control panel and a control panel add-on device. The terms "alarm system" and "monitoring system" may be used interchangeably throughout this specification.

As shown in FIG. 1A, a property 10 (e.g., a home) of a user 50 is monitored by an alarm system (e.g., an in-home security system) that includes components that are fixed within the property 10. The alarm system includes a control panel 20, a basement door sensor 22, a motion sensor 24, and a back door sensor 26. The basement door sensor 22 is a contact sensor positioned at a basement door of the property 10 and configured to sense whether the basement door is in an open position or a closed position. The motion sensor 24 is configured to sense a moving object within the property 10. The back door sensor 26 is a contact sensor positioned at a back door of the property 10 and configured to sense whether the back door is in an open position or a closed position. The alarm system shown in FIG. 1A is merely an example and the alarm system may include more, or fewer, components and different combinations of sensors.

The control panel 20 communicates over a short-range wired or wireless connection with each of the basement door sensor 22, the motion sensor 24, and the back door sensor 26 to receive sensor data descriptive of events detected by the basement door sensor 22, the motion sensor 24, and the back door sensor 26. The control panel 20 also communicates over a wireless connection with a monitoring server 30.

The monitoring server 30 is located remote from the property 10 and manages the alarm system at the property 10, as well as other (and, perhaps, many more) alarm systems located at different properties that are owned by different users. The monitoring server 30 receives, from the control panel 20, sensor data descriptive of events detected by the sensors included in the alarm system of the property 10. The monitoring server 30 also detects alarm events at the property 10 based on the received sensor data and provides commands to the control panel 20 to remotely control the alarm system. The monitoring server 30 further communicates with a mobile device 60 (e.g., a smartphone) of the user 50 and a central station server 62. The monitoring server 30 may communicate with the mobile device 60 to provide notifications and status information related to the alarm system and to receive control commands that enable the user 50 to remotely control the alarm system using the mobile device 60. The monitoring server 30 may communicate with the central station server 62 to report that an alarm event detected by the alarm system at the property 10 has been identified as an emergency situation, where the central station server 62 may then dispatch emergency services in response to the report from the monitoring server 30.

The control panel 20 may communicate with the monitoring server 30 over a private connection. A private connection may be a connection over a virtual private network (VPN). The private connection may enable communications to be initiated by any one of the control panel 20, the monitoring server 30, and the mobile device 60. For instance, without a private connection, a monitoring server 30 may not be able to send a communication to the control panel 20 unless the control panel 20 has sent a communication to the monitoring server 30 within a predetermined amount of time. The private connection may be a connection that is kept open even when there is no traffic so that communications may be initiated by the control panel 20, the monitoring server 30, and the mobile device 60 at any time. The private connection may also enable the monitoring server 30 to be accessed by the control panel 20 in a non-public fashion. For example, the monitoring server 30 may be associated with an address that is only accessible through a particular virtual private network accessed using the private connection.

In a particular example, a private connection is established between the control panel 20 and the monitoring server 30. It is initiated by the panel 20, and it is maintained by the panel 20 through regular packets of data that the panel 20 sends to the server 30. As long as the panel 20 maintains that private connection, the monitoring server 30 is able to send data packets back to the panel 20 at any time. This may be especially important when the user is trying to send commands to the panel 20 via the mobile device 60 (arming, disarming, unlocking doors, changing temperature of the thermostat(s) linked to the panel, etc.). Without this private connection, the user may only be able to send commands during a small time window (e.g., less than one minute) following a data packet sent by the panel 20 to the server 30. The private connection may make it possible to have time windows that last several hours after each panel 20 to server 30 packet. By having the panel 20 send these packets 30 at least every few hours, the window may be prolonged indefinitely. The mobile device 60 is connected to the monitoring server 30 via an internet connection that is controlled by the mobile device 60. That connection may not need to be maintained since the mobile device 60 may be polling the server 30 only when the mobile device 60 needs to—usually to refresh a page on the app or to send a command to the panel 20 via the server 30.

The control panel 20 may establish the private connection over a cellular network. For instance, the control panel 20 may include a Long-Term Evolution (LTE) enabled chip that allows the control panel to establish a private connection to the monitoring server 30 using a LTE connection.

The property 10 also includes an internet access point 70. For example, the internet access point 70 may be a home wireless router. The internet access point 70 may enable the user device 52 to establish public connections to one or more public servers 80. For example, the internet access point 70 may provide internet access for the user device 52. Public servers 80 may be servers on the internet that are associated with public internet protocol addresses. The user device 52 may be a desktop computer, a laptop computer, a mobile device, an internet protocol enabled camera, or another internet enabled device.

The internet access point 70 may provide a source of internet within the property that is known by the control panel 20. For example, the control panel 20 may know a SSID and password for connecting to a wireless local network provided by the internet access point 70. The internet access point 70 receives communications from the control panel 20. The communications may include communications for the internet access point 70 to transmit over a public connection and/or communications requesting indications from the internet access point 70 if internet access is available.

In the case of communications for the internet access point 70 to transmit over the public connection, in some implementations, communications may be sent to the monitoring server 30 through both a private connection and a public connection. Sending communications to the monitoring server 30 using a private connection may be more secure and reliable, but more costly and time consuming than sending communications over a public connection. However, in certain circumstances, the monitoring server 30 may be able to be reached via a public connection but not via a private connection. For example, a VPN server for the monitoring server 30 may be malfunctioning, but an internet-cloud based service interfacing with the monitoring server 30 may be functioning. Accordingly, the control panel 20 may send communications that are important over both the private connection and the public connection, or over only the private connection. On the other hand, the control panel 20 may send communications that are not important over only the private connection or only the public connection.

In some implementations, the control panel 20 may also retry sending communications more frequently or a greater number of times for more important messages. For example, the control panel 20 may retry sending an intruder alert communication every second until successful, but may retry sending a temperature reading only once after five minutes.

The control panel 20 may determine the importance of a communication based on rules. For instance, communications may be associated with types. Types of communications may include, low battery, status update, intruder detected, temperature related, light level related, door open detection, etc. Accordingly, the control panel may have stored rules that define that communications related to intruder detected are important and should be send via both a private connection and a public connection, and that define that communications related to low battery are not important and should be send via a private connection only.

In the case of communications requesting indications from the internet access point 70 if internet access is available, the control panel 20 may transmit a request to the internet access point 70 to indicate whether internet access is available through the internet access point 70. For example, if the internet access point 70 does not provide a response that internet access is available within a pre-determined amount of time, e.g., two hundred milliseconds, one second, three seconds, etc., or provides a response that no internet access is available, the control panel 20 may determine that no internet access is available through the internet access point 70. In another example, if the internet access point 70 does provide a response that internet access is available within a pre-determined amount of time, the control panel 20 may determine that internet access is available through the internet access point 70.

The control panel 20 may intermittently poll the internet access point 70 to detect if internet access is available from the internet access point 70. For example, the control panel

20 may poll the internet access point every five seconds, every twenty seconds, or every minute. Additionally or alternatively, the control panel 20 may poll the internet access point 70 in response to events detected by the control panel 20. For instance, the control panel 20 may determine that the property 10 has lost power so the internet access point 70 is likely turned off. In response, the control panel 20 may poll the internet access point 70, receive no response as the internet access point 70 is not powered, and in response, determine that the internet access point 70 is no longer providing internet access. In some implementations, the control panel 20 may poll in response, or poll more frequently in response to particular events. For example, the control panel 20 may determine that there is unusual activity in the property 10 and determine to poll the internet access point 70 more frequently while the unusual activity is occurring.

In the example shown in FIG. 1B, in response to the control panel 20 determining that internet access is no longer available through the internet access point 70, the control panel may provide internet access to the user device 52. For example, the control panel 20 may be used with a carrier that enables the control panel to keep open a first socket for a private connection over a VPN to the monitoring server 30 and simultaneously open a second socket for public connections to public servers 80. In this example, the control panel 20 may include Wi-Fi access hardware, e.g., Wi-Fi access point chips, which enables the control panel to provide internet access. Alternatively, the control panel 20 may be in data communication, e.g., through Ethernet, with Wi-Fi hardware, e.g., Wi-Fi access point chips, that is included in a physically separate device within the monitoring system. In some implementations the control panel may be a client of a known source of internet within the property. In another example, the control panel 20 may be used with a carrier that only enables the control panel 20 open a single socket. In this example, the control panel 20 may indicate in a header of communications over the single socket whether a communication is intended for a private connection or a public connection. The carrier may then route communications indicated by a header as being for a private connection through a private connection and communications indicated by a header as being for a public connection through a public connection.

As shown in FIG. 1B, the control panel 20 may provide internet access by serving as a wireless router. For example, as described above with reference to FIG. 1A, the control panel 20 may include Wi-Fi access hardware, e.g., Wi-Fi access point chips, which enables the control panel 20 to establish a public connection to the internet. Alternatively, the control panel 20 may be in data communication with a physically separate device that includes Wi-Fi access hardware, e.g., Wi-Fi access point chips, that enables the control panel 20 to establish a public connection to the internet. In some implementations the control panel may be a client of a known source of internet within the property.

For instance, the control panel 20 may transmit a notification, e.g., a SSID, which indicates that the control panel 20 is now providing internet access. The control panel 20 may then receive a connection request from the user device 52 and connect with the user device 52. After the control panel 20 connects with the user device 52, the control panel 20 may directly receive communications from the user device 52 to transmit over a public connection, and transmit communications to the user device 52 from the public connection.

The user device 52 may include a security sensor that communicates through a public connection. For instance, the user device 52 may be an internet Protocol camera that provides images over the internet. The user device 52 may be configured so that communicates with the monitoring server 30 while the internet access point 70 provides internet access, but when the internet access point 70 is no longer providing internet access, communicate with the monitoring server 30 over a public connection provided by the control panel 20. The user device 52 may be configured to include pre-stored access credentials to access the control panel for internet access. For example, the pre-stored access credentials may include a secure service identifier and an access key.

The control panel 20 may additionally filter communications when providing internet access. The control panel 20 may send communications over a LTE connection where the use of bandwidth may be limited and/or more costly than use of bandwidth through another source, e.g., a wired cable internet provider. Accordingly, the control panel 20 may filter communications to limit use of bandwidth. The control panel 20 may limit the use of bandwidth based on prioritizing communications to be sent over a private connection to the monitoring server 30, and de-prioritizing communications to be sent over a public connection to public servers 80. For example, in cases where there is insufficient bandwidth to send all communications, the control panel 20 may defer sending communications over the public connection. The control panel 20 may additionally or alternatively limit access to particular types of content over the internet. For instance, the control panel 20 may block access to streaming video, streaming audio, or file sharing services. In another example, the control panel 20 may throttle the bandwidth used for streaming video, streaming audio, or file sharing services.

The control panel 20 may also be used in property in which there is no internet access point 70. For example, paying for broadband wired internet for a vacation home that is rarely used may be costly. Accordingly, the control panel 20 may solely provide internet access to a property.

In the example shown in FIG. 1C, the control panel 20 may alternatively be a non-Internet enabled control panel that may be in communication with a control panel add-on 90. The control panel add-on 90 may be an add-on device that expands the capability of an existing control panel that does not use the Internet. The add-on control panel 90 may perform the functions of the control panel 20 shown in FIG. 1B that relate to the private and public connections. For example, the add-on Internet device 90 may provide the public connection for the user device 52 to access the internet and the private connection for the control panel 20 to communicate with the monitoring server 30. In the example, the control panel add-on 90 may function similarly to how the control panel 20 functions in FIG. 1B in regards to routing communications over a private connection and a public connection.

Figure 2:
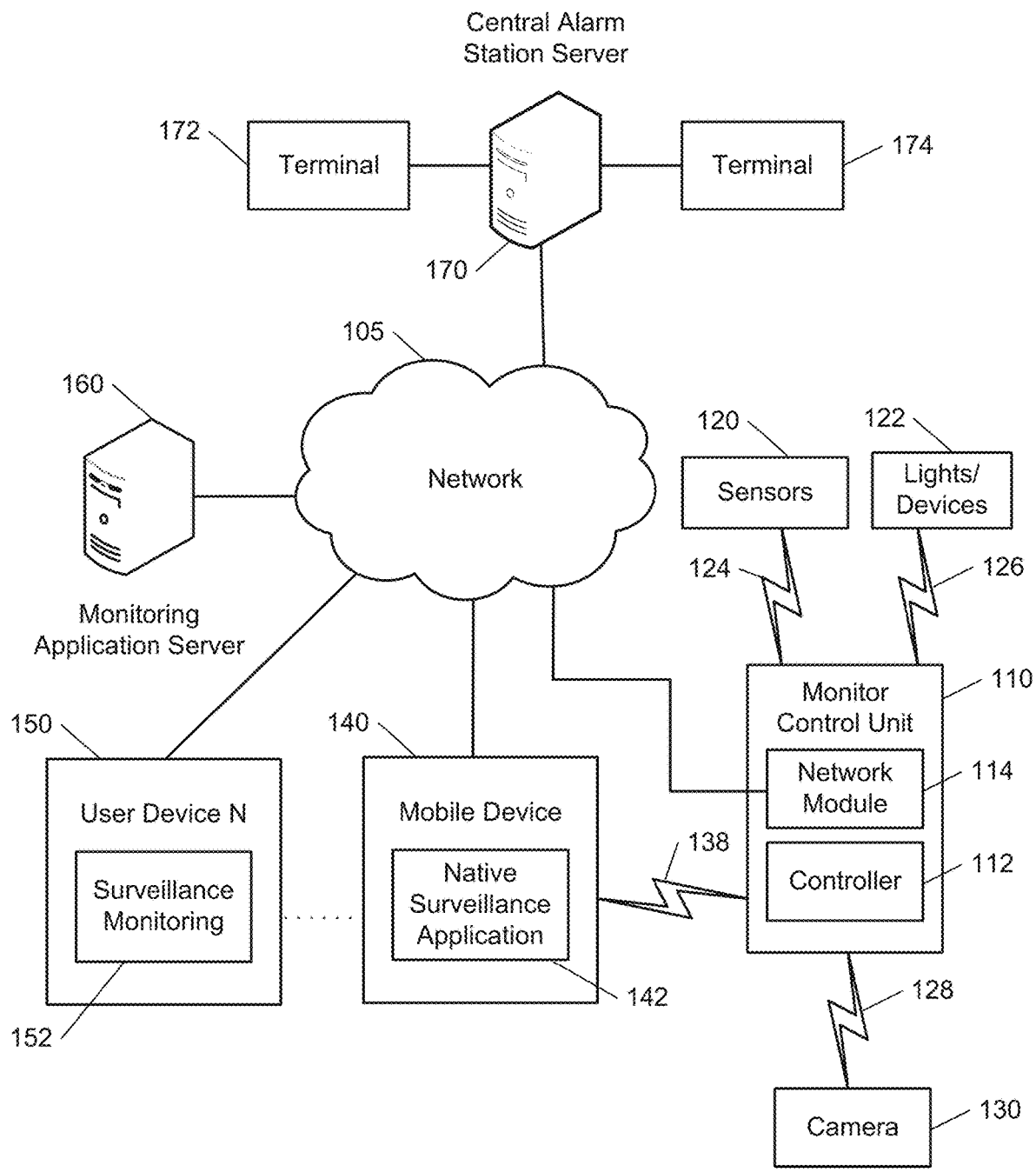
FIG. 2 illustrates an example system.

FIG. 2 illustrates an example of an electronic system 200 configured to provide surveillance and reporting. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance, monitoring, and/or control operations. The module 122 is connected to one or more lighting systems and/or one or more household devices (e.g., thermostat, oven, range, etc.) and is configured to control operation of the one or more lighting systems and/or the one or more household devices. The module 122 may control the one or more lighting systems and/or the one or more household devices based on commands received from the monitoring system control unit 110. For instance, the module 122 may cause a lighting system to illuminate an area to provide a better image of the area when captured by a camera 130. The module 122 also may control the one or more lighting systems and/or the one or more household devices to perform energy management and/or user convenience operations (e.g., adjusting a temperature setting of a thermostat and turning an oven off and on to meet energy management and user convenience goals).

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may include a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the, maintaining an electronic calendar, etc.

The user device 140 includes a native surveillance application 142. The native surveillance application 142 refers to a software/firmware program running on the corresponding mobile device that enables the user interfaces and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as Wi-Fi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some examples, the monitor control unit 110 and/or the controller 112 may perform operations similar to those described above as being performed by the control panel 20 described in FIGS. 1A-1C.

Figure 3:
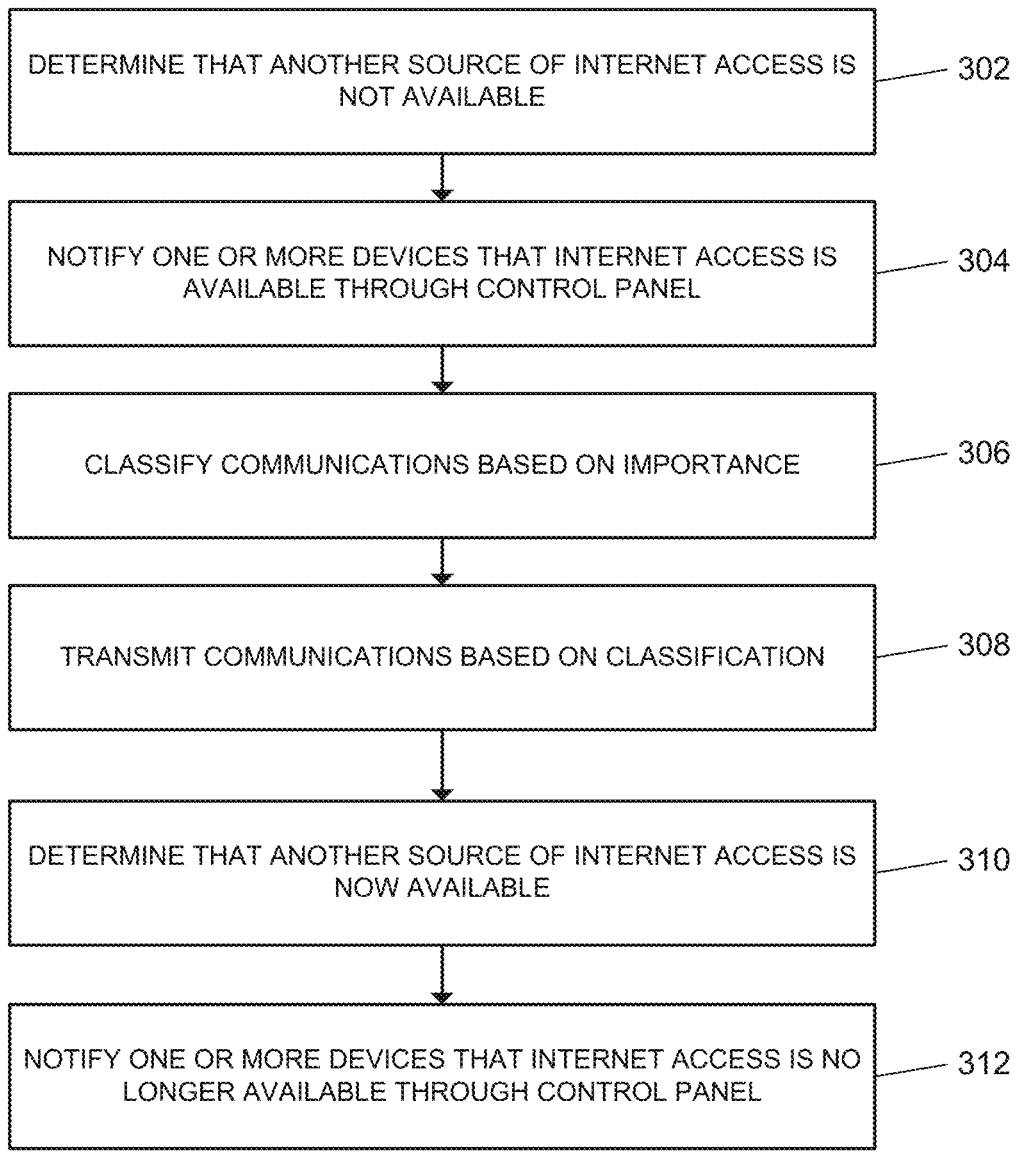
FIGS. 3 and 4 are flow charts of example processes for providing internet access.

FIG. 3 is a flow chart of an example process 300 for providing internet access. The system 200 determines that another source of internet access is not available (302). For example, a control panel of a monitoring system may determine that an internet access point has not responded to a request for internet access status within a predetermined amount of time, and in response, determine that another source of internet access is not available. In another example, a control panel of a monitoring system may receive a response from an internet access point that internet access is not available.

In response to determining that another source of internet access is not available, the system 200 notifies one or more devices that internet access is available through the control panel (304). For instance, the control panel may begin broadcasting a SSID or broadcast a message that indicates that the control panel is now providing internet access.

The system 200 classifies communications based on importance (306). For example, the control panel may classify communications as of particular types of importance, where very important communications are send via a private connection and a public connection, important communications are send via a private connection, and unimportant communications are send via a public connection. In this example, the rules may specify that communications related to events detected by a monitoring system are at least important, and communications from devices to access the internet are unimportant communications.

The system 200 transmits the communications based on the classifications (308). For example, the control panel may transmit communications classified as very important over both a private connection and a public connection, transmit communications classified as important over a private connection, and transmit communications classified as unimportant over a public connection.

The system 200 determines that another source of internet access is now available (310). For instance, the control panel may determine that an internet access point is again transmitting a SSID, in response provide a request to the internet access point for an indication whether internet access is available through the internet access point, and receive a confirmation that internet access is available.

In response to determining that another source of internet access is now available, the system 200 notifies one or more devices that internet access is no longer available (312). For example, the control panel may cease broadcasting a SSID or transmit an indication that the control panel is disconnecting from the one or more devices.

Figure 4:
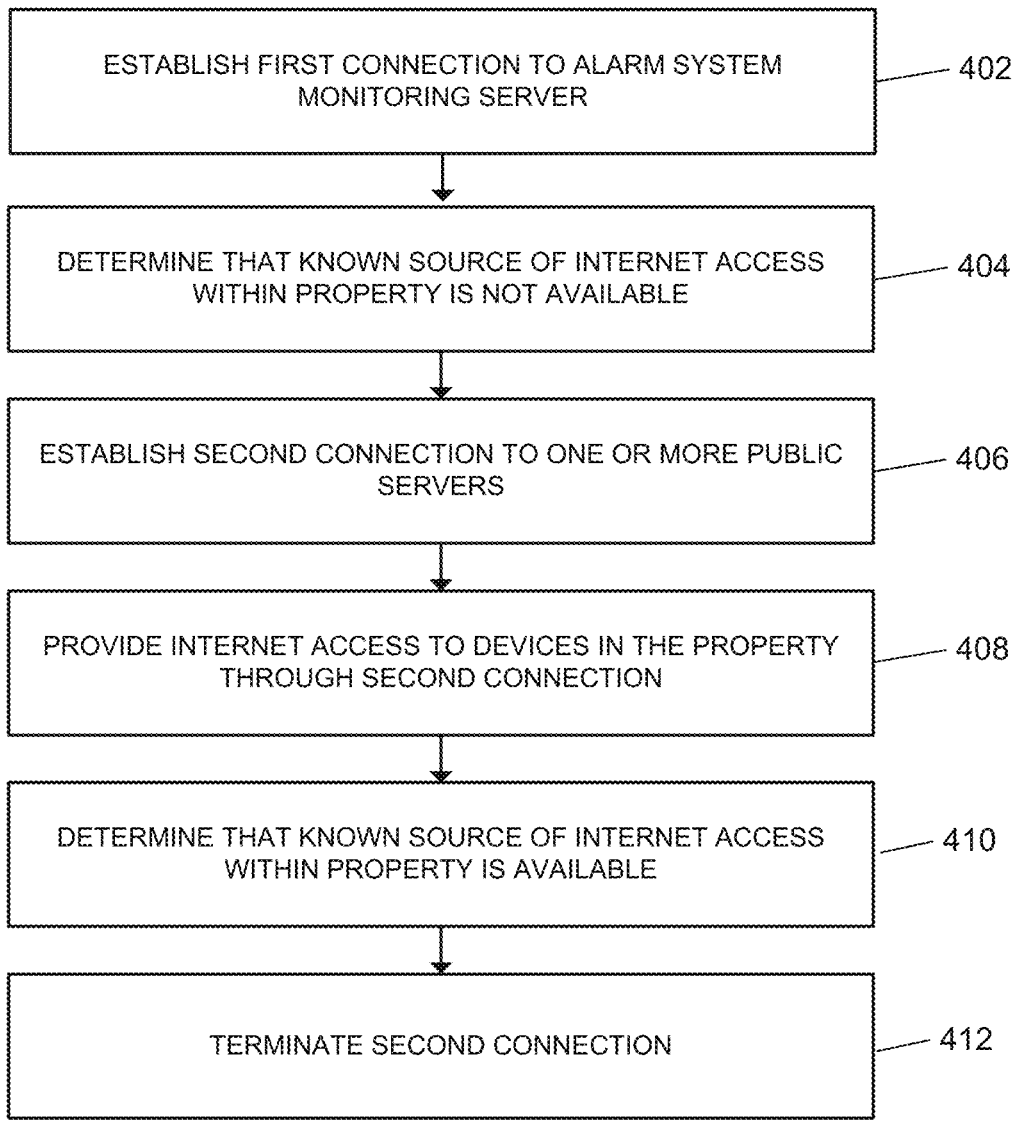

FIG. 4 illustrates an example process 400 for providing internet access. For convenience, the process 400 will be described as being performed by a system of one or more computers located in one or more locations. For example, a monitoring system, e.g., the monitoring system 100 of FIG. 1, appropriately programmed in accordance with this specification, can perform the process 400.

The system establishes, by a control panel 20 of an alarm system in a property 10, a first connection to an alarm system monitoring server across a cellular network (402). In some implementations the first connection is a private connection to the alarm system monitoring server that the system establishes across the cellular network.

The system determines that a known source of internet within the property 10 is not available (404). For example, as described above with reference to FIG. 1A, the system may intermittently poll a known internet access point 70 within the property 10, e.g., a known home wireless router, to detect if internet access is available from the internet access point 70. In some implementations the system may send requests for internet access status at regular predetermined intervals of time, e.g., every five seconds, every twenty seconds, or every minute, to the internet access point 70 of the known source of internet within the property 10. The system may determine that the known source of internet within the property is not available by determining that the internet access point 70 of the known source of internet has not responded to the sent requests for internet access status within a predetermined amount of time.

In some implementations the system may determine that a known internet access point 70 within the property, e.g., a home wireless router, is functioning correctly, but the known source of internet within the property that is provided by the known internet access point 70 is not available. For example, the control panel 20 may request to access a known internet protocol address, e.g., 8.8.8.8, or a known domain name, e.g., www.google.com, and in response to not receiving a response, determine that the internet access is not available from the internet access point 70.

In response to determining that the known source of internet within the property is not available, the system establishes, by the control panel 20, a second connection to the internet across the cellular network (406). In some implementations the second connection is a public connection to the internet that the control panel 20 establishes a public connection to one or more public servers.

As described above with reference to FIG. 1B, in some implementations the control panel 20 of the alarm system includes Wi-Fi access hardware, and the system establishes the second connection to the internet across the cellular network by enabling the Wi-Fi access hardware and providing internet access using the Wi-Fi access hardware.

In other implementations the control panel 20 of the alarm system may be in data communication with Wi-Fi access hardware that is located in a physically separate device, e.g., a device that is within the monitoring system of the property 10, and the system establishes the second connection to the internet across the cellular connection by enabling the Wi-Fi access hardware and providing internet access using the Wi-Fi access hardware.

In some implementations the system may further establish a third connection to a central station server across the cellular network. The third connection may be a public connection that the system may establish to the central station server. For example, the third connection to the central station server may be achieved by the control panel 20 opening a secure socket layer connection with the central station server within the second connection. The third connection may be solely dedicated to the control panel 20, such that if, for example, a back-end data center of the monitoring system fails, critical communications may be transmitted directly to the central station server 62 through the third connection.

The system provides internet access to one or more devices 52 in the property 10 through the second connection (408). For example, as described above with reference to step (406), the system may provide internet access to one or more devices 52 within the property 10 by enabling Wi-Fi access hardware included in the control panel 20, or by enabling Wi-Fi access hardware that is physically separate to the control panel 20 but in data communication with the control panel 20.

In some implementations the system may intermittently disable the provided internet access to the one or more devices 52 in the property 10 through the second connection. For example, the system may disable the internet access through the second connection due to a detected alarm event at the property 10. Upon detecting an alarm event, such as a fire alarm or other emergency situation, the system may cease providing internet access through the second connection in order to ensure that the second connection cannot negatively impact the sending of an alarm signal to the monitoring server 30 and/or central station server 62.

In another example, the system may disable the provided internet access through the second connection if one or more devices attempt to use the internet access for prohibited or costly actions e.g., streaming video or music. In some implementations a user of the monitoring system may determine one or more rules or settings that specify under which circumstances the internet access through the second connection is to be disabled, as described in more detail below with reference to FIG. 6.

In a further example, the system may determine that the property 10 is unoccupied, e.g., using motion sensors included in the monitoring system, and disable the internet access through the second connection. In some implementations, upon detecting that the property is occupied once again, the system may reactivate the internet access.

In an additional example the system may disable the provided internet access when monitoring data from the monitoring system is negatively impacting the connectivity of the provided internet access. For example, sometimes the monitoring system may be required to send large amounts of data through the first connection, resulting in poor connectivity through the second connection. The system may determine to disable the provided internet access when the connectivity through the second connection is lower than a predetermined threshold, e.g., 3 Mbs.

The system may be configured to notify a user of the one or more devices 52 of the property 10 when disabling the internet access through the second connection by sending a message (e.g., electronic mail message or short message service) to the devices that are using the internet access shortly prior to or at the disablement of the internet access connection, as described below with reference to FIG. 7.

The system determines that the known source of internet within the property is available (410). For example, as described above with reference to step 404, the system may intermittently poll an internet access point 70 within the property, e.g., a home wireless router, to detect if internet access is available from the internet access point 70. The system may determine that the known source of internet within the property is available by determining that the internet access point 70 of the known source of internet has responded to requests for internet access status with a predetermined amount of time, e.g., within five seconds, twenty seconds, or a minute, and indicates that internet access is available.

In response to determining that the known source of internet within the property 10 is available, the system terminates, by the control panel 20, the second connection (412). For example, the control panel 20 may stop broadcasting a SSID of a wireless local area network for other devices to join and stop broadcasting communications for the wireless local area network. In some implementations the system may notify the one or more devices 52 in the property that internet access is no longer available through the control panel 20. For example, the control panel 20 may send communications to other devices that cause the devices to redirect web browsers to a notification that internet access is no longer available from the SSID provided by the control panel 20 but is now available from the SSID provided by the known internet access point 70. In other implementations the one or more devices 52 in the property may be configured to automatically connect to the known source of internet within the property 10 when it becomes available.

Figure 5:
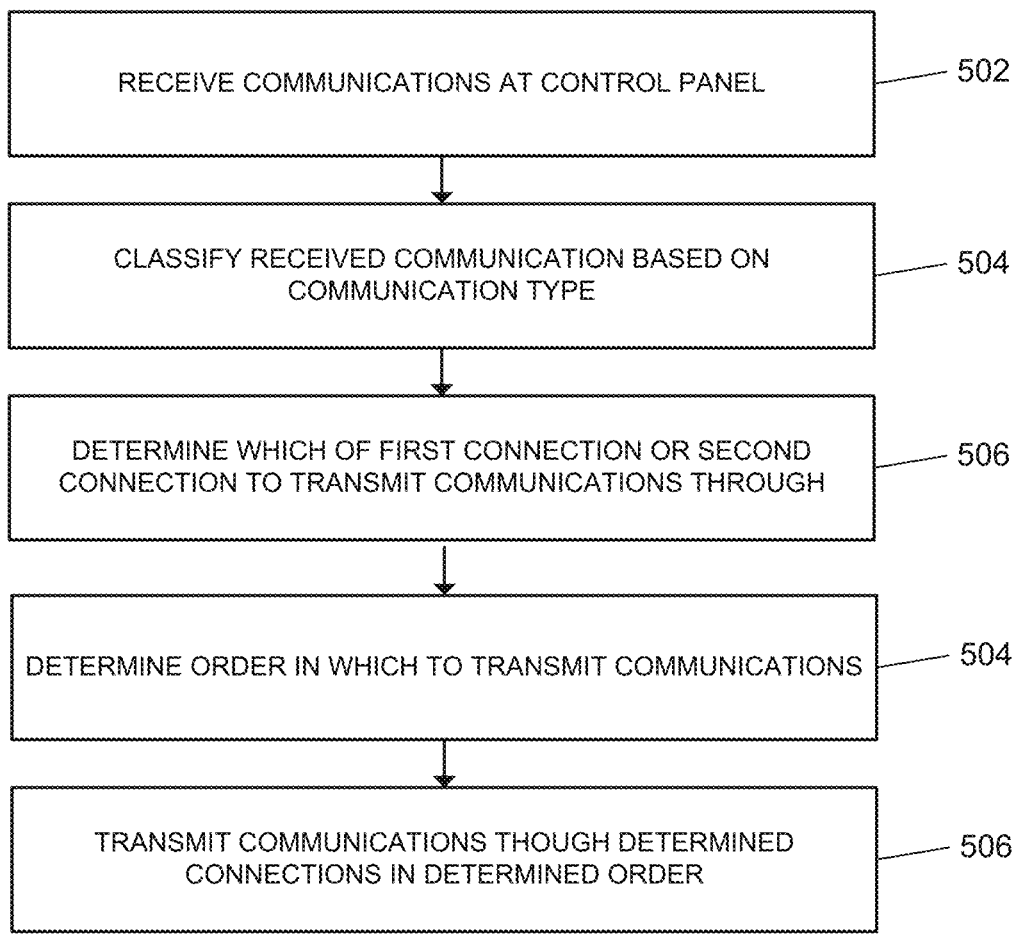
FIG. 5 is a flow chart of an example process for transmitting communications over a first and second connection.

FIG. 5 is a flow chart of an example process 500 for transmitting communications over a first and second connection. For convenience, the process 500 will be described as being performed by a system of one or more computers located in one or more locations. For example, a monitoring system, e.g., the monitoring system 100 of FIG. 1, appropriately programmed in accordance with this specification, can perform the process 500.

The system receives communications at the control panel 20 of the alarm system (502). For example, as described above with reference to FIG. 1A, the control panel 20 may receive communications from one or more sensors, e.g., a motion sensor 24, back door sensor 26 or basement door sensor 22, included in the monitoring system, or from a monitoring server 30 associated with the monitoring system. Whilst providing internet access to one or more devices 52 in the property through the second connection, as described above with reference to step 408 of FIG. 4, the system may further receive communications from the one or more devices 52 in the property, e.g., communications relating to web browsing.

The system classifies the received communications based on communication type (504). For example, the system may classify the received communications as monitoring system event communications or non-monitoring system event communications. Types of monitoring system communications may include, low battery, status update, intruder detected, temperature related, light level related, door open detection, etc. Other, non-monitoring system event communication types may include web browsing.

Based on the classification of the received communications, the system determines which of the first connection or second connection to transmit the communications through (506). In some implementations the system may implement an algorithm that is pre-programmed in the control panel 20 of the alarm system in order to determine which of the first connection or second connection to transmit the communications through. For example, the algorithm may define rules that specify which type of communication should be sent by which connection, such as specifying that monitoring system communications relating to intruder detection are important and should be sent via both a private connection and a public connection, or that monitoring system communications relating to low battery warnings are not important and should be sent via a private connection only. The algorithm may further specify that certain communications are not to be sent through either of the first or second connection, such as communications relating to streaming videos or music.

In some implementations, based on the classification of the received communications, the system may select the first connection to transmit the communications through and throttle the second connection. For example, the control panel 20 may work together with the network carrier and throttle the second connection if a number of bytes transmitted from the control panel in a given period of time has exceeded a predefined limit, or if a user of a device that is using the internet access provided by the control panel is requesting to access a forbidden IP address.

In some cases throttling the second connection may include disabling the second connection. For example, the system may receive communications relating to an alarm event from the monitoring system, and determine that the current connection signal is weak or suffering from interference. The system may therefore determine to throttle the second connection in order to ensure the successful transmission of the communications relating to the alarm event via the first connection.

The system determines an order in which to transmit the communications (508). For example, in some implementations it may be beneficial for the system to prioritize the transmission of some communications over the communications of other communications, e.g., in situations where the bandwidth of the connections over the cellular network is limited and not allowing for communications to be transmitted simultaneously.

In some implementations the system may determine an order in which to transmit the communications by assigning a weight to each communication based at least on the determined first or second connection in which the communication is to be transmitted through. For example, as described above, whilst providing internet access to one or more devices in the property through a public connection, the system may receive communications from the monitoring system, e.g., critical and non-critical monitoring data, and communications from the one or more devices to which are accessing the internet via the control panel 20. The system may assign each communication a weight indicative of an urgency or importance of the communication. For example, a higher urgency weighting may be assigned to communications relating to critical monitoring data compared to communications relating to web browsing. As another example, a communication that has been waiting in a queue to be transmitted may be assigned a higher urgency weighting than a communication of equal importance that has not been waiting to be transmitted. The system may implement a weighting algorithm programmed in the control panel 20*m* of the monitoring system to assign weights to the received communications. The system may rank the weighted communications, e.g., according to decreasing urgency weightings, to determine an order in which to transmit the communications.

In response to determining which of the first connection or second connection to transmit the communications through and the order in which to transmit the communications, the system transmits the communications through the determined connections in the determined order (510).

Figure 6:
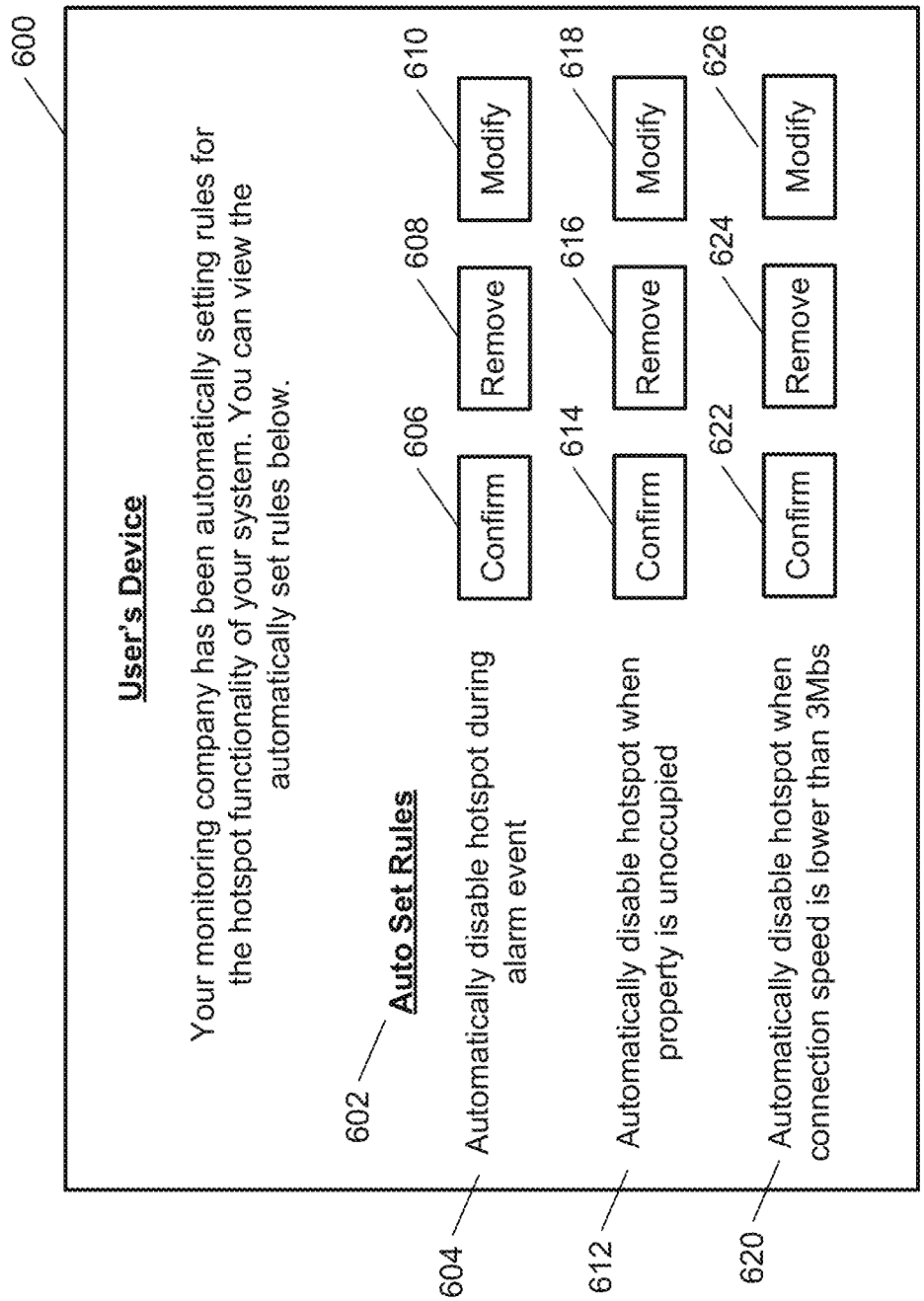
FIGS. 6 and 7 are example user interfaces.

FIG. 6 illustrates an example interface 600 that alerts a user to rules automatically set for the providing internet access through a monitoring system that monitors a property. The system 200 may automatically set the rule without human intervention or without any user input. The interface 600 may be part of a message (e.g., electronic mail message) sent to a device of a user of a monitoring system or may be displayed when the user of the monitoring system accesses a web page associated with the monitoring system. The system 200 may cause display of interface 600 when new rules for providing internet access through the monitoring system have been automatically set.

As shown, the interface 600 includes a list of automatically set rules 602. A first rule 604 is to automatically disable internet access provided by the monitoring system during an alarm event. For example, the system may detect an alarm event at the property, e.g., a fire alarm, carbon dioxide alarm or other emergency situation, and require that an alarm signal is transmitted through a private or public connection to a central station server. In order to ensure that the alarm signal is successfully transmitted to the central station server, or at least to increase the chances of a successful transmission, the system may disable the Wi-Fi functionality of the monitoring system. In some implementations the system may notify a user prior to or when disabling the internet access provided by the monitoring system, as described below with reference to FIG. 7.

The interface 600 includes a confirm control 606 that receives input to confirm that the first rule 604 should be set for the monitoring system. The interface 600 also includes a remove control 608 that receives input to remove the first rule 604 for the monitoring system. The interface 600 further includes a modify control 610 that receives input to confirm that the first rule 604 should be set for the monitoring system, but in a modified format. For example, a user may wish to apply the rule for a subset of specific alarm events. The modify control 610 may cause display of another interface that enables a user to provide input to modify the first rule 604 by adding, removing, and/or changing criteria for meeting the rule and/or changing actions taken when the rule has been met. The system 200 may consider decisions to confirm, remove, and modify the first rule 604 in future automatic setting of rules for the monitoring system of the user.

A second rule is to automatically disable internet access provided by the monitoring system when the property is unoccupied. For example, the monitoring system may be configured to determine an occupancy of the property at a given time, e.g., through the use of infrared, ultrasonic or microwave sensors. Upon detecting that the property is unoccupied, the system may cease to provide internet access through the monitoring system to improve system efficiency and to avoid wasting resources.

The interface 600 includes a confirm control 614 that receives input to confirm that the second rule 612 should be set for the monitoring system. The interface 600 also includes a remove control 616 that receives input to remove the second rule 612 for the monitoring system. The interface 600 further includes a modify control 618 that receives input to confirm that the second rule should be set for the monitoring system, but in a modified format. The modify control 618 may cause display of another interface that enables a user to provide input to modify the second rule by adding, removing, and/or changing criteria for meeting the rule and/or changing actions taken when the rule has been met. The system 200 may consider decisions to confirm, remove, and modify the second rule 612 in future automatic setting of rules for the monitoring system of the user.

A third rule 620 is to automatically disable internet access provided by the monitoring system when the connection speed of the hotspot is lower than a predetermined value, e.g., lower than 3 Mbs. For example, sometimes the monitoring system may be required to send large amounts of monitoring data, e.g., security data from IP cameras, through the first or second connection. In these situations, the sending of the monitoring data may be prioritized over the sending of regular web browsing data, as described above with reference to FIG. 5, and the connectivity of the second connection may be negatively impacted. Upon detecting that the connection speed provided by the hotspot at the monitoring system is lower than a predetermined lower limit, the system may disable the internet access.

The interface 600 includes a confirm control 622 that receives input to confirm that the third rule 620 should be set for the monitoring system. The interface 600 also includes a remove control 624 that receives input to remove the third rule 620 for the monitoring system. The interface 600 further includes a modify control 626 that receives input to confirm that the third rule should be set for the monitoring system, but in a modified format. For example, a user may select a minimum connection speed of their choice. The modify control 626 may cause display of another interface that enables a user to provide input to modify the third rule by adding, removing, and/or changing criteria for meeting the rule and/or changing actions taken when the rule has been met. The system 200 may consider decisions to confirm, remove, and modify the third rule 620 in future automatic setting of rules for the monitoring system of the user.

Other rules may be used as well. For example, another rule may be that when a remote device requests to view a video feed of a security camera within the property, the monitoring system may disable the second connection to ensure that sufficient bandwidth is available for transmitting the video feed to the remote device.

Figure 7:
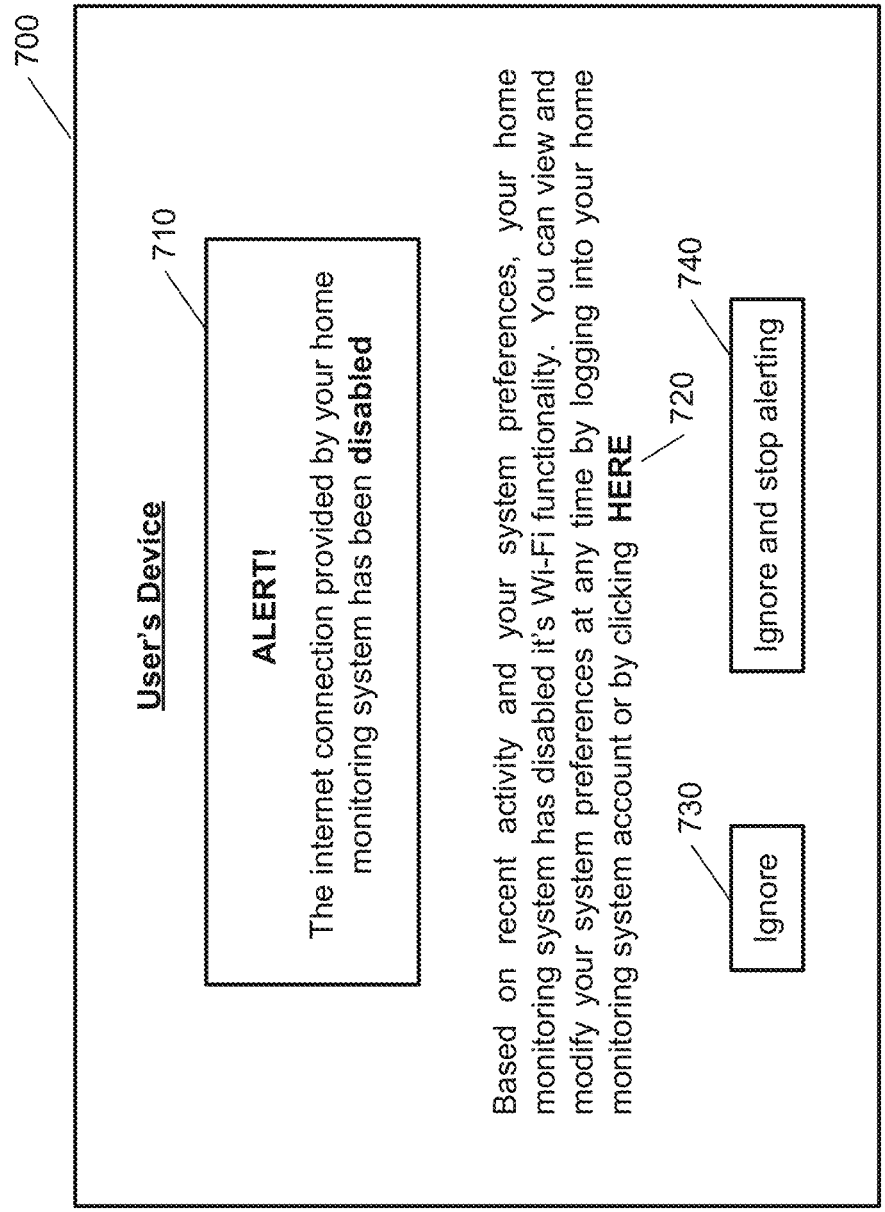

FIG. 7 illustrates an example interface 700 that alerts a user to a disabling of an internet access connection through a monitoring system. The interface 700 may be part of a message (e.g., electronic mail message or short message service) sent to a device of a user of a monitoring system that is connected to the source of internet provided by the monitoring system shortly prior to or at the disablement of the internet access connection.

The system 200 may automatically determine to disable internet access provided by the monitoring system, e.g., due to an alarm event at the property, as described above with reference to FIG. 6. In other implementations, as described above with reference to step 410 of FIG. 4, the system may disable internet access provided by the monitoring system when a known source of internet within the property is available. In any case, as shown in FIG. 7, the interface 700 includes an alert box 710 that clearly informs the user that the internet connection provided by the monitoring system has been disabled.

The interface includes a hyperlink control 720 that receives input to confirm that the user wishes to view, and potentially subsequently modify, their system preferences. The hyperlink control 720 may cause display of another interface that enables a user to view their home monitoring system account.

The interface 700 further includes an ignore control 730 and an ignore and stop alerting control 740. The ignore control 730 receives user input to indicate that the user would like to ignore the internet connection disabling alert. For example, the system may have disabled internet access provided by the monitoring system because a known source of internet within the property became available. The user may notice that the known source of internet access is available, and may wish to ignore the notification informing the user that internet access through the monitoring system is no longer available. The ignore and stop alerting control 740 receives user input to indicate that the user would like to ignore the internet connection disabling alert and also that the user would like to stop receiving alerts related to internet connection disabling.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method comprising:
    establishing, by a control panel of a monitoring system located in a property, a connection to a monitoring system server using a cellular network;
    obtaining, by the control panel, (i) a first communication associated with the monitoring system, and (ii) attributes of the first communication;
    identifying, by the control panel and based on the attributes of the first communication, a communication type of the first communication;
    obtaining, by the control panel, a second communication associated with a device located at the property and for a public server;
    determining, by the control panel, that the second communication is associated with the device located at the property and for the public server;
    disabling, based on the communication type of the first communication and that the second communication is associated with the device located at the property and for the public server, transmission of the second communication over the cellular network; and
    providing, by the control panel, the first communication to the monitoring system server over the cellular network.

2. The method of claim 1, wherein identifying, by the control panel and based on the attributes of the first communication, a communication type of the first communication comprises:
    identifying the communication type as monitoring system event.

3. The method of claim 2, wherein identifying the communication type as monitoring system event comprises:
    identifying the communication type as an alarm event.

4. The method of claim 1, wherein determining, by the control panel, that the second communication is associated with the device located at the property and for the public server comprises:
    determining that the second communication is received from a user device.

5. The method of claim 1, wherein determining, by the control panel, that the second communication is associated with the device located at the property and for the public server comprises:
    determining that the second communication is to be sent over the Internet.

6. The method of claim 1, wherein disabling, based on the communication type of the first communication and that the second communication is associated with the device located at the property and for the public server, transmission of the second communication over the cellular network comprises:
    disabling Wi-Fi provided by the monitoring system to the device.

7. The method of claim 1, wherein disabling, based on the communication type of the first communication and that the second communication is associated with the device located at the property and for the public server, transmission of the second communication over the cellular network comprises:
    providing a notification to the device that network access for the device will be disabled.

8. The method of claim 1, comprising:
    determining that a request to view a video feed of a security camera has been received; and
    based on determining that a request to view a video feed of a security camera has been received, disabling transmission of a third communication over the cellular network.

9. The method of claim 1, comprising:
    determining that the property is unoccupied; and
    based on determining that the property is unoccupied, disabling transmission of a third communication over the cellular network.

10. A system comprising:
    one or more computers and one or more storage devices storing instructions that are operable, when executed by the one or more computers, to cause the one or more computers to perform operations comprising:
        establishing, by a control panel of a monitoring system located in a property, a connection to a monitoring system server using a cellular network;
        obtaining, by the control panel, (i) a first communication associated with the monitoring system, and (ii) attributes of the first communication;
        identifying, by the control panel and based on the attributes of the first communication, a communication type of the first communication;
        obtaining, by the control panel, a second communication associated with a device located at the property and for a public server;
        determining, by the control panel, that the second communication is associated with the device located at the property and for the public server;
        disabling, based on the communication type of the first communication and that the second communication is associated with the device located at the property and for the public server, transmission of the second communication over the cellular network; and
        providing, by the control panel, the first communication to the monitoring system server over the cellular network.

11. The system of claim 10, wherein identifying, by the control panel and based on the attributes of the first communication, a communication type of the first communication comprises:
    identifying the communication type as monitoring system event.

12. The system of claim 11, wherein identifying the communication type as monitoring system event comprises:
    identifying the communication type as an alarm event.

13. The system of claim 10, wherein determining, by the control panel, that the second communication is associated with the device located at the property and for the public server comprises:
    determining that the second communication is received from a user device.

14. The system of claim 10, wherein determining, by the control panel, that the second communication is associated with the device located at the property and for the public server comprises:
    determining that the second communication is to be sent over the Internet.

15. The system of claim 10, wherein disabling, based on the communication type of the first communication and that the second communication is associated with the device located at the property and for the public server, transmission of the second communication over the cellular network comprises:
    disabling Wi-Fi provided by the monitoring system to the device.

16. The system of claim 10, wherein disabling, based on the communication type of the first communication and that the second communication is associated with the device located at the property and for the public server, transmission of the second communication over the cellular network comprises:

providing a notification to the device that network access for the device will be disabled.

17. The system of claim 10, the operations comprising:
determining that a request to view a video feed of a security camera has been received; and
based on determining that a request to view a video feed of a security camera has been received, disabling transmission of a third communication over the cellular network.

18. The system of claim 10, the operations comprising:
determining that the property is unoccupied; and
based on determining that the property is unoccupied, disabling transmission of a third communication over the cellular network.

19. A non-transitory computer-readable medium storing software comprising instructions executable by one or more computers which, upon such execution, cause the one or more computers to perform operations comprising:
establishing, by a control panel of a monitoring system located in a property, a connection to a monitoring system server using a cellular network;
obtaining, by the control panel, (i) a first communication associated with the monitoring system, and (ii) attributes of the first communication;
identifying, by the control panel and based on the attributes of the first communication, a communication type of the first communication;
obtaining, by the control panel, a second communication associated with a device located at the property and for a public server;
determining, by the control panel, that the second communication is associated with the device located at the property and for the public server;
disabling, based on the communication type of the first communication and that the second communication is associated with the device located at the property and for the public server, transmission of the second communication over the cellular network; and
providing, by the control panel, the first communication to the monitoring system server over the cellular network.

20. The medium of claim 19, wherein identifying, by the control panel and based on the attributes of the first communication, a communication type of the first communication comprises:
identifying the communication type as monitoring system event.

* * * * *